F. McCALLIN.
FENDER.
APPLICATION FILED JULY 19, 1916.
1,198,140.
Patented Sept. 12, 1916.
4 SHEETS—SHEET 1.
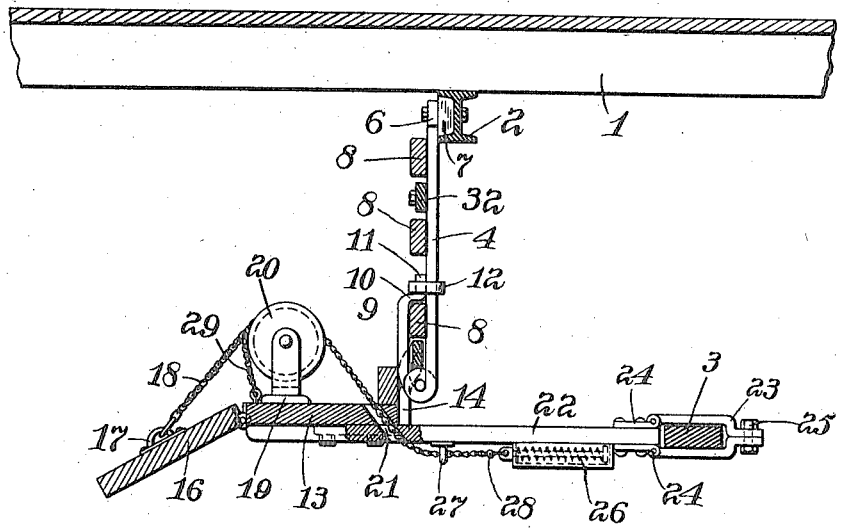
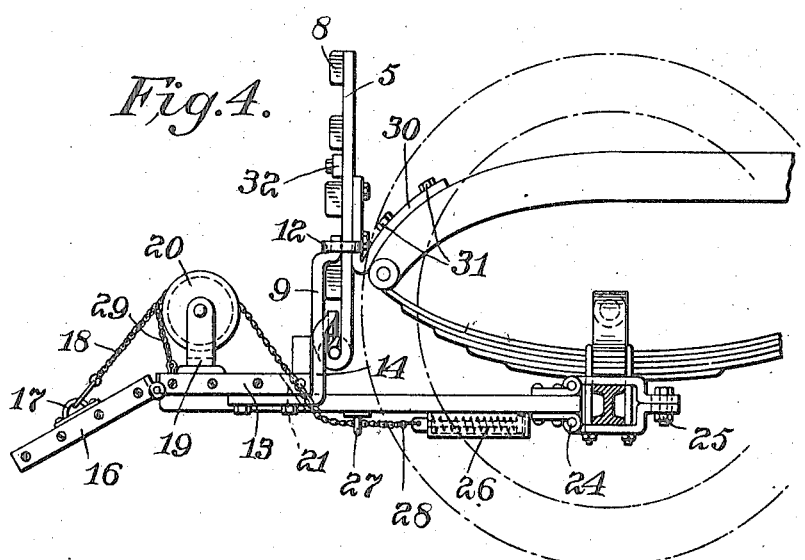
Inventor:
Francis McCallin,
by Parker Cook
Atty.

F. McCALLIN.
FENDER.
APPLICATION FILED JULY 19, 1916.

1,198,140.

Patented Sept. 12, 1916.
4 SHEETS—SHEET 2.

Inventor.
Francis McCallin,
by Parker Cook
Atty.

F. McCALLIN.
FENDER.
APPLICATION FILED JULY 19, 1916.

1,198,140.

Patented Sept. 12, 1916.
4 SHEETS—SHEET 3.

Inventor:
Francis McCallin,
by Parker Cook
Atty.

F. McCALLIN.
FENDER.
APPLICATION FILED JULY 19, 1916.

1,198,140.

Patented Sept. 12, 1916.
4 SHEETS—SHEET 4.

Inventor:
Francis McCallin,
by Parker Cook
Atty.

UNITED STATES PATENT OFFICE.

FRANCIS McCALLIN, OF LONG ISLAND CITY, NEW YORK.

FENDER.

1,198,140.

Specification of Letters Patent. Patented Sept. 12, 1916.

Application filed July 19, 1916. Serial No. 110,068.

*To all whom it may concern:*

Be it known that I, FRANCIS MCCALLIN, a citizen of the United States, residing at Long Island City, in the county of Queens and State of New York, have invented certain new and useful Improvements in Fenders, of which the following is a specification.

My invention relates to new and useful improvements in fenders which may be readily used and placed in position on the front of an electric or trolley car, or with a few slight changes may be made easily adaptable for use with automobiles.

An object of my invention is to produce an arrangement wherein the fender when in use either on an automobile or on a surface car has a lower portion which normally is in a slightly raised position but low enough to the ground so that it will be impossible for anyone to pass thereunder and, on the other hand, when the fender is struck or comes in contact with a pedestrian the shock will be somewhat taken up by the fender and at the same time the fender decreases in its angle of elevation so that it extends at right angles to the ground and will prevent the person or object struck from going under the wheels.

Still another object of my invention is to produce a fender that may be easily and readily attached to the trolley car or to an automobile and may be quickly and readily detached therefrom if so desired.

Still another object of my invention is to produce a fender wherein the springs are positioned on the guides or supports of the fender so that the same take up a minimum amount of space.

Still another object of my invention is to produce a fender of the character described that will be relatively cheap to construct and easy to manufacture, having but few parts and relatively light in weight.

With these and other objects in view my invention consists in certain new and novel constructions and combination of parts as will be hereinafter more fully described and pointed out in the claims.

Figure 2:
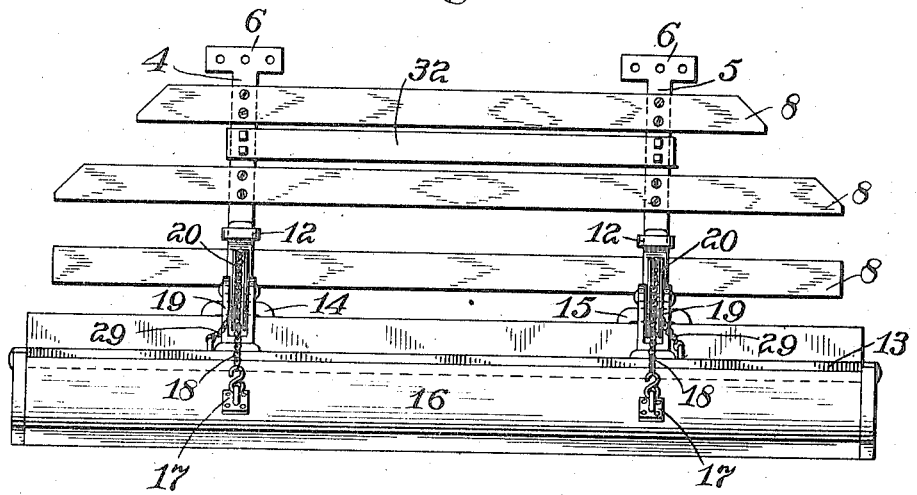
Figure 3:
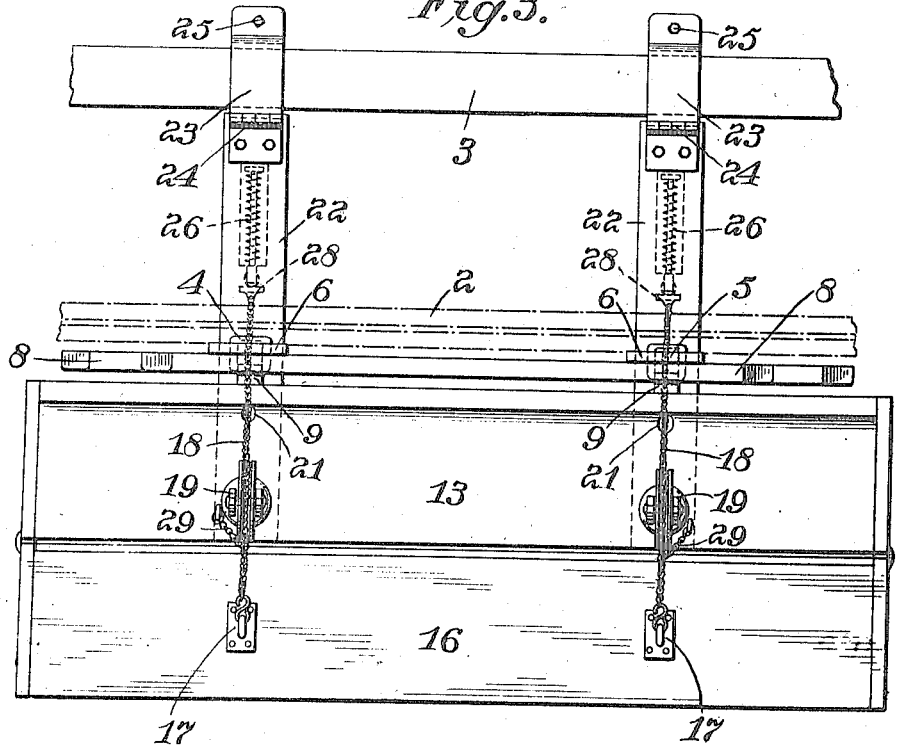
Figure 5:
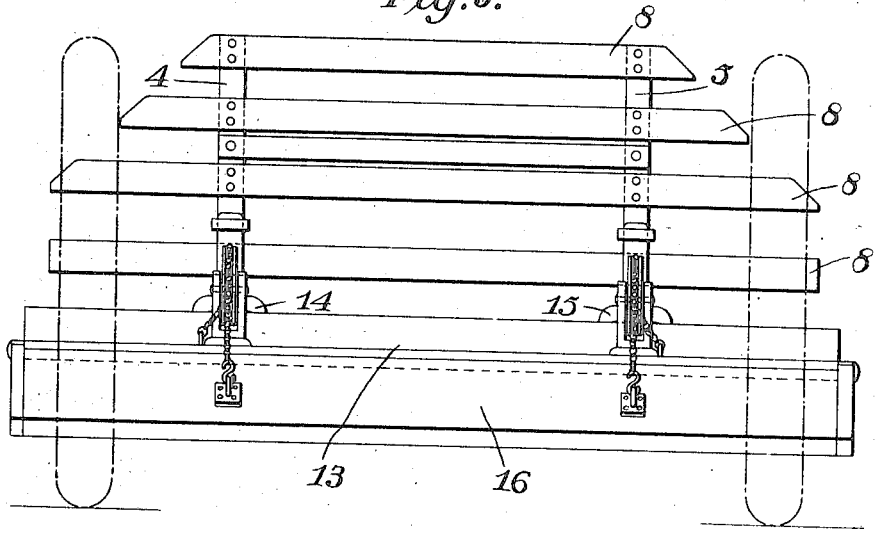
Figure 6:
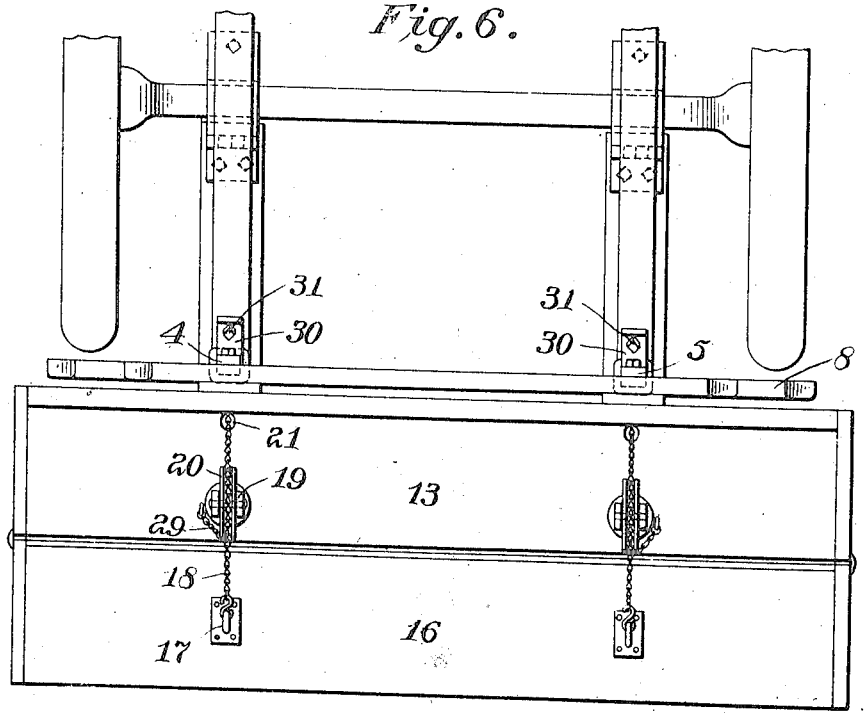
Figure 7:
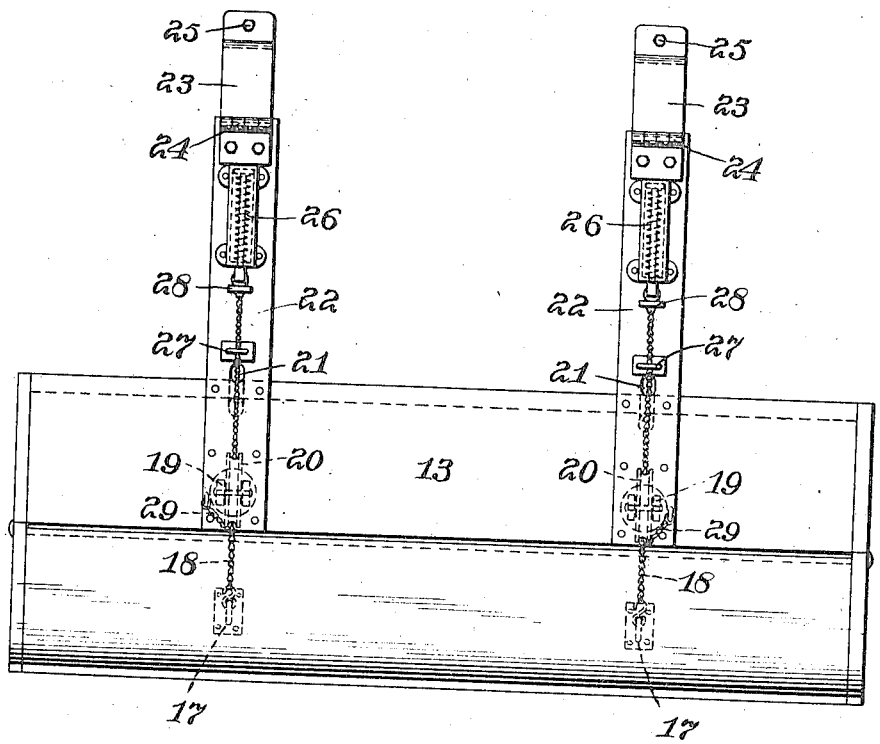
Figure 8:
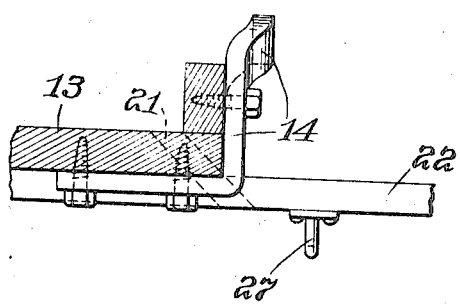

Referring now to the drawings, Figure 1 is a sectional view longitudinally of a car. Fig. 2 is a front elevation thereof. Fig. 3 is a top plan view. Fig. 4 is a sectional view showing the improved fender attached to the front of an automobile. Fig. 5 is a front elevation of the device as shown in Fig. 4. Fig. 6 is a top plan view showing the device as attached in Fig. 4. Fig. 7 is a bottom plan view of the fender in a detached position and Fig. 8 is an enlarged detail.

Referring now to the drawings there is shown a portion of a longitudinal beam or sill of a car 1, and a beam 2, which extends transversely of the car or in other words from sill to sill, a beam 3 is also shown which extends transversely of the car and which beam is more clearly shown in Fig. 3. This beam may be conveniently fastened to the under portion of the steps at the front of the car (not shown), or at any convenient position. It will be understood that the two beams above mentioned, that is 2 and 3 may be fastened in any preferable position or manner, just so they extend transversely of the said car.

Referring now to Fig. 2 for the moment, it will be seen that forming a part of my improved fender are the two uprights 4 and 5 which are identical and a description of the one will be a description of the other. These uprights preferably have a T head 6 which is fastened in any preferable manner to the beam 2, and as shown in Fig. 1, this beam in this instance has a filler 7, so that there will be no unnecessary rattle. Extending between the uprights 4 and 5 are secured the guards or strips 8 which are also fastened in any preferable manner, and may be of metal or wood as desired. The lower ends of these uprights 4 and 5 are preferably doubled on themselves to form the hinged loop 9 and near the upper portion of the loop the same is again bent as at 10 inwardly and then upwardly as at 11, so that a sliding ring 12 may be conveniently placed over the same to hold the loop in its normal or locked position.

Referring now to the lower portion of the fender which is attached to the two uprights 4 and 5 just described, it will be seen that there is what I term a foundation board 13, which is adapted to extend at right angles to the said uprights 4 and 5 and to which foundation board are rigidly secured the hangers 14 and 15 which hangers are adapted to pass over the portions 9 of the two uprights 4 and 5, of course after the ring 12 has been moved upwardly. This foundation board 13 extends completely across the front of the car and at its outer edge is hinged a member which I conveniently term the life guard 16. This life guard 16 is capable of a swinging movement from a vertical position, that is the lower end from a position directly opposite or at right angles to the foundation board 13 to a horizontal position. Secured to this life guard 16 are the two eyelets 17 to which in turn are fastened the chains 18. Also in this instance the chains and their coacting tension members are identical, and a description of the one is a description of the other. Located on the said foundation board 13 are the two uprights, or bases 19 in which are mounted the pulleys 20 and over each of which passes the heretofore mentioned chains 18, which chains pass through openings 21 in the said foundation board 13. Referring now for the moment to Figs. 3 and 7 it is to be noticed that there are also two inwardly extending supports 22, the outer ends of which are secured to and support the said foundation board 13 and which supports 22 extend longitudinally of the car and back to the beam 3, and at the rear ends of these supports 22 are the yokes 23 which are hinged as at 24, and may be locked when placed around the beam 3 by the bolt 25. Any form of fastening means at the rear end of these supports 22 may be employed although the form shown is a practical one. Located on the under surface of these supports 22 are the tension members 26, which may be as strong as desired and of any form, this member *per se* not forming any part of my invention, although a member so constructed that the spring may be enlarged or decreased, being of course preferable. Located also on the bottom of these supports 22 are the eyelets 27, through which the chains 18 pass. They also pass through the said supports 22 and connect at their rear end to the tension members 26. These eyelets 27 should be very rigidly secured to the said supports 22 as fastened to the said chains 18, and at a slight distance behind each eyelet 27 is a bolt or pin 28 that is too large to pass through the eyelet 27 which is adapted to contact on the inner side of the eyelet 27 and act as a stop or guard on the chain 18, so that any load on the said chain 18 beyond the limit of the tension member 26, will be taken up on the eyelet 27, rather than adding an increased shock to the tension member 26, which might destroy the same. Also fastened on the front of the foundation board 13 are the small chains 29 which are adapted to be fastened to the chains 18 to regulate the upward position of the life guard 16. These chains preferably have a hook on the end thereof and may be hooked in any link of the chain 18 to prevent the said life guard 16 from being raised to too high a position.

The running or normal position therefore of the fender is as shown in Fig. 1, and it will be readily seen that if a person should fall under the car he would strike the life guard 16, and the impact would force the same downwardly to a vertical position, the shock being transmitted through the chain 18 to the tension element 26 and a great amount of the shock would be taken up by the said tension element. As soon as the person is removed, the life guard will again be pulled to the position as shown in Fig. 1 by the tension element 26 through the chain 18. By also providing the short chain 29, the life guard can be set in different positions and at such a position so that it is just too low for a person to pass under the same and still high enough not to strike any small objects or bumps in the road bed.

As before mentioned the foundation board is supported by the supports 22 at its forward end and which in turn are held in their horizontal position by the hangers 14 over the upright supports 4 and 5, and as this is not a rigid connection, the necessary and slight amount of play is obtained. Also the bolts 25 at the rear of the straps 22 may be unfastened and the ring 12 may be slipped upward so that the supports 22, the foundation board 13 and the life guard 16 may be quickly and readily removed if desired.

Referring now to Figs. 4, 5 and 6, the improved device with a few slight changes or fastening means are shown as secured to the chassis of an automobile. In this instance extra straps 30 are secured to the uprights 4 and 5 and are in turn bolted to the longitudinal frames of the chassis as at 31, the fastening means on the rear end of the supports are similar to those used in the other form but preferably a little larger, as the axles of most automobiles are I beams, therefore necessitating a wider yoke. The operation of the device is similar and it will be understood that the cross pieces 8 may be closer together or farther apart or a greater or lesser number used as desired. In both forms I have shown an extra cross piece 32 to make the device more rigid, and it will also be understood that any other form of bracing means may be used.

From the above description it will be seen that with the improved arrangement as shown, it will be impossible for a person to get under the wheels, that a great amount of the shock will be taken up by the life guard 16 through the tension members 26, that the said life guard may be normally raised to the position desired and that the same after being forced downwardly by an impact will stay in its downward position until the fallen body is moved out of contact with the said board when it will again rise to its normal position. The tension elements are located directly on the rearwardly extending supports so that the whole device takes up but a minimum amount of space, is positive in action and easily repaired if damaged. It will also be understood that many slight changes as to form, connecting means, etc., may be employed without departing from the spirit and scope of my invention.

Having thus described my invention what I claim as new and desire to secure by Letters Patent is:—

1. In a fender, supporting means adapted to be secured at their upper ends, a foundation board secured to said supporting means and remaining in its set position when in use and extending at right angles thereto, hinged means secured to said foundation board and tension means connected indirectly with said means fastened at the outer end of said foundation board to normally hold the said means in a set position.

2. A fender comprising upright supports, a foundation board extending at right angles to said supports and retained by said upright supports and remaining in its set position when in use, supporting means secured to said foundation board and extending rearwardly thereof and adapted to be secured at their rear ends, tension means located on said rearwardly extending supports, a life guard secured at the forward end of said foundation board, and means connecting said tension support and said life guard to permit said life guard to be swung downwardly when hit and to return said life guard to its normal position.

3. A fender comprising two vertically extending uprights, a foundation board movably held by said uprights, supports secured to said foundation board and extending rearwardly thereof, a life guard secured to the outer end of said foundation board, pulleys on said foundation board, tension members on said rearwardly extending supports, a chain fastened to said tension elements passing over said pulleys and connected with said life guard to hold the said life guard in a fixed position and to take up the shock when said life guard is forced downwardly.

4. A fender comprising uprights, having the lower ends thereof bent upwardly, a life guard having eyelets adapted to pass over the upwardly bent portion of said uprights, supports connected at their forward ends to said foundation board and extending rearwardly to a transversely extending member, tension members located on the under portion of said support, a hinge member secured to the forward end of said foundation board and connected with a chain to said tension members to normally hold the life guard in a set position, means connected with said chain to limit the upward movement of said life guard and means secured to said rearward supports for limiting the tension movement of said tension element.

5. A fender comprising two uprights, bars extending between said uprights, a foundation board movably secured to said uprights, said foundation board provided with two guide wheels, a life guard secured to the outer end of said foundation board, rearwardly extending supports fastened at their forward end to said foundation board and adapted to be securely held at their rearward ends, tension elements secured to said rearwardly extending supports, chains connecting said tension elements and passing over said guide wheels and through said supports and foundation board to said life guard to return the said life guard to its upward position and to take up the impact on said life guard when the same is struck.

In testimony whereof I have hereunto affixed my signature.

FRANCIS McCALLIN.